No. 125,613

UNITED STATES PATENT OFFICE.

NATHANIEL A. PRATT, OF CHARLESTON, SOUTH CAROLINA.

IMPROVEMENT IN TREATING PHOSPHATES OF LIME FOR THE MANUFACTURE OF FERTILIZERS.

Specification forming part of Letters Patent No. 125,613, dated April 9, 1872.

Specification describing a new Process for Treating Crude Phosphates of Lime so as to rid them of foreign matters, and by diminishing their bulk give them a form and composition more suitable for shipment or for domestic use, invented by NATHANIEL A. PRATT, of Charleston, South Carolina.

My process is adapted to all kinds of phosphates, but is intended for use more particularly in connection with the native phosphates of South Carolina. I take of these, or other phosphates finely ground, say, one hundred parts; of sulphuric acid of 66° B., or its equivalent of more dilute acid, from fifty to sixty parts, or so much as may be required to render all the phosphoric acid of the crude phosphates soluble; of water, one hundred and fifty to two hundred parts; of lime, unslaked, or its equivalent of any other convenient form, as much as may be required—say two parts. I slake the lime ready for use, and, adding sufficient water, reduce it to a thin smooth paste by any mechanical means. I mix the phosphates, the acid, and the water thoroughly, in any ordinary mixer, and in any convenient quantity, and transfer the mixed mass at once to a hydraulic or other press, and express and collect liquors containing the phosphoric acid or phosphates in solution. The residual cake will weigh one hundred and forty to one hundred and fifty parts, and is to be utilized as a fertilizer, either alone or incorporated with other ingredients. I then heat the liquors and the lime paste by a jet of steam, or otherwise, to a temperature of 180° F., more or less, according to the concentration of the solutions, and pour one into the other in such proportions as to cause them to neutralize each other, and, raising the temperature, continue to boil and stir mechanically until the reaction is complete, when the phosphate of lime will precipitate completely. I transfer this mass to the press and condense this phosphate of lime into cakes, which, when dry, will contain from ninety to ninety-five per cent. of phospate of lime, and be of a form convenient for shipment.

The quantity of sulphuric acid and lime employed is governed by the percentage of phosphoric acid and of other ingredients in the crude phosphates acted on, and is to be varied accordingly.

Other bases may also be used besides lime to condense the phosphoric acid; such as magnesia and alkaline, or other salts.

I claim—

1. The method of extracting the phosphoric acid or soluble phosphates, by means of a hydraulic or other press, immediately after mixing, substantially as set forth.

2. The process of treating phosphates of lime to rid them of foreign matters and increase their value and portability, substantially as set forth.

N. A. PRATT

Witnesses:
W. Y. LEITCH,
R. S. BRUNS.